United States Patent
Venkataraman et al.

(10) Patent No.: US 10,324,770 B2
(45) Date of Patent: Jun. 18, 2019

(54) EFFICIENT APPLICATION FEEDBACK COLLECTION

(71) Applicant: CA, Inc., New York, NY (US)

(72) Inventors: Seshadri Venkataraman, Union City, CA (US); Vishwanath Alevoor, Hyderabad (IN); Suman Sagar Cherukuri, Cupertino, CA (US)

(73) Assignee: CA, Inc., New York, NY (US)

( * ) Notice: Subject to any disclaimer, the term of this patent is extended or adjusted under 35 U.S.C. 154(b) by 524 days.

(21) Appl. No.: 15/074,371

(22) Filed: Mar. 18, 2016

(65) Prior Publication Data

US 2017/0269976 A1 Sep. 21, 2017

(51) Int. Cl.
*G06F 9/54* (2006.01)
*G06F 21/62* (2013.01)

(52) U.S. Cl.
CPC ............ *G06F 9/54* (2013.01); *G06F 21/6245* (2013.01)

(58) Field of Classification Search
None
See application file for complete search history.

(56) References Cited

U.S. PATENT DOCUMENTS 9,633,426 B2 * 4/2017 Bendall ................. G06T 7/0004
2011/0029665 A1 2/2011 Wenig et al.
2014/0074452 A1 * 3/2014 Carmi ....................... G06F 8/10
 703/22
2014/0108911 A1 4/2014 Damale
2014/0253574 A1 * 9/2014 Brown .................. G06T 1/0007
 345/545

OTHER PUBLICATIONS

Greger, et al., "Introduction to Tealeaf", Tealeaf, Industry Solutions 2013 Fast Start, https://www-304.ibm.com/industries/publicsector/fileserve?contentid=243509 as visited Feb. 9, 2016, 2012, 28 pages.

* cited by examiner

*Primary Examiner* — Umut Onat
(74) *Attorney, Agent, or Firm* — Gilliam IP PLLC

(57) ABSTRACT

To reduce the risk of exposing personally identifiable information (PII) and reduce resource consumption while still collecting helpful screen-based experience data, an application feedback system can build an application screen library from initial screen captures. When sufficient screens of an application have been captured for the library, the application feedback system can stop collecting actual screen captures. Instead, agents at the host devices (i.e., devices hosting the application) can capture screen identifiers instead of screens and transmit the screen identifiers along with other screen-based application experience data. For screen-based application experience playback, the application feedback system constructs a playback sequence with screens from the screen library as identified by the screen identifiers. Since a screen identifier can be implemented as a basic data type, storing and transmitting of the screen identifier consumes substantially less resources than storing and transmitting of image data for a captured screen.

20 Claims, 6 Drawing Sheets

EFFICIENT APPLICATION FEEDBACK COLLECTION

BACKGROUND

The disclosure relates generally to data collection and processing, and more particularly to efficient collection of data about user interactions with screens of a software application.

Today's users demand unparalleled performance, reliability and stability on applications they use. To ensure user loyalty, companies need to consistently provide the best possible experience to their users. However, without visibility into the actual dynamics of the user interaction, determining the cause of poor user experience may be expensive and time consuming.

Application feedback systems (hereinafter "feedback systems") may provide companies with data on application performance metrics like availability, network latency, execution correctness, and page composition. To collect this data, an agent on an end user's device can capture user interaction with each screen of an application. The captured screens and interactions can later be played back in sequence to observe the user interaction.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to collecting application experience data for an application session in illustrative examples. But aspects of this disclosure can be applied to websites, web applications, operating systems, etc. In other instances, well-known instruction instances, protocols, structures and techniques have not been shown in detail in order not to obfuscate the description.

Overview

Collecting a large amount of screen-based application experience data across a large number of users can provide a developer greater insight into user experience and guide application design (or redesign), updates, etc. But, the larger amount of data representing the screen-based application experience data costs a greater amount of resources. Ongoing collection and transmission of application experience data with images of captured application screens consumes memory, processor cycles, and energy at each device, and consumes bandwidth of the network(s) carrying the application experience data. Moreover, a greater amount of images of captured application screens increases a risk of exposing personally identifiable information (PII).

To reduce the risk of exposing PII and reduce resource consumption while still collecting helpful application experience data, an application feedback system can build an application screen library from initial screen captures. When sufficient screens of an application have been captured for the library (e.g., a predefined baseline number of screens), the application feedback system can stop collecting actual screen captures. Instead, agents at the host devices (i.e., devices hosting the application) can capture screen identifiers instead of screens and transmit the screen identifiers along with other application experience data. For screen-based application experience playback ("application experience playback"), the application feedback system constructs a playback sequence with screens from the screen library as identified by the screen identifiers. Since a screen identifier can be implemented as a basic data type (e.g., string, integer, float, etc.), storing and transmitting of the screen identifier consumes substantially less resources than storing and transmitting of image data for a captured screen (e.g., several bytes compared to hundreds of kilobytes).

Example Illustrations

Figure 1:
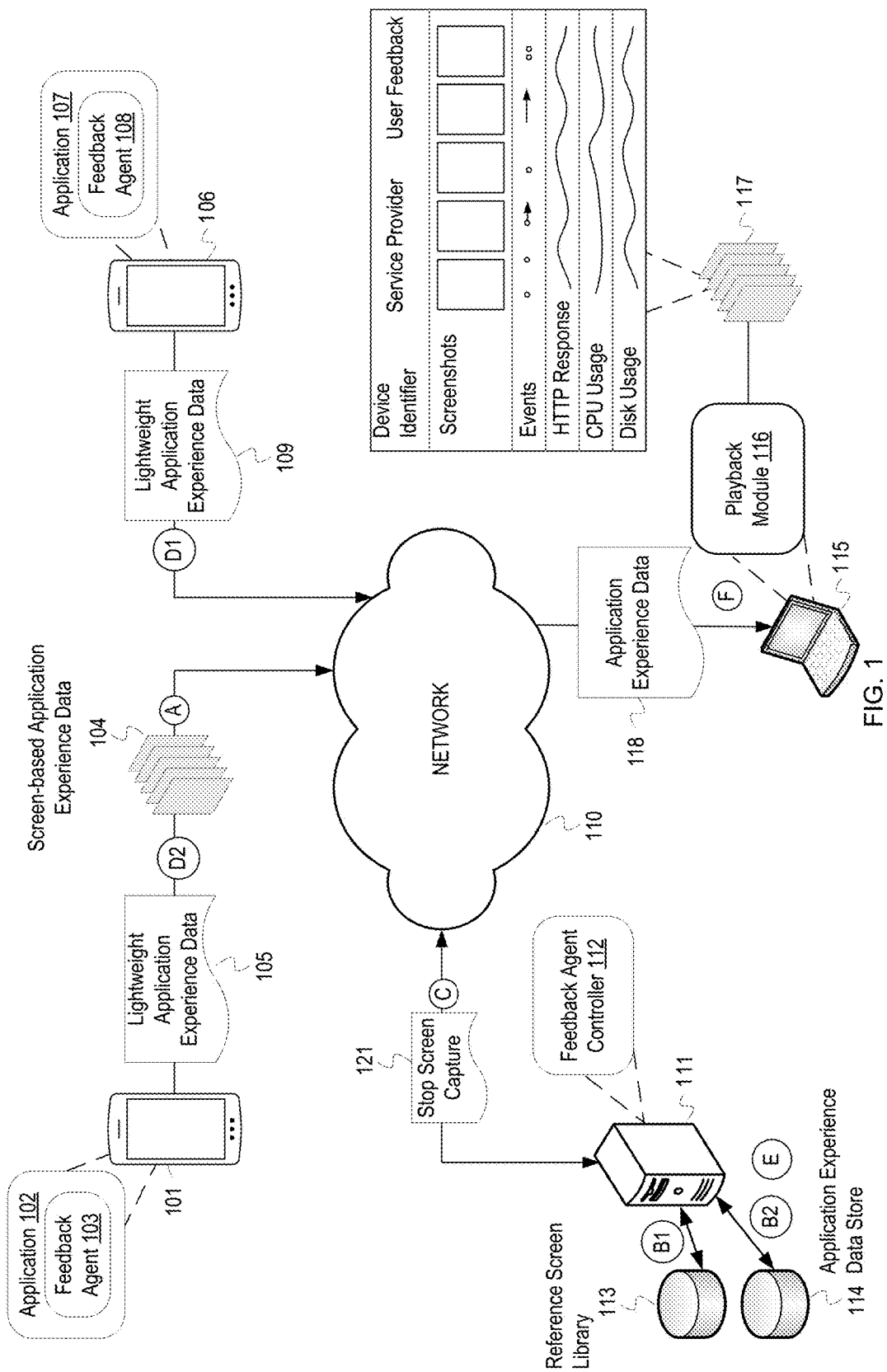
FIG. 1 depicts a conceptual example of an application feedback system leveraging a reference screen library for application experience playback.

FIG. 1 depicts a conceptual example of an application feedback system leveraging a reference screen library for application experience playback. The example application feedback system depicted in FIG. 1 includes a feedback agent controller 112 and feedback agents 103 and 108. The feedback agents 103, 108 are respectively deployed with application instances 102, 107. A mobile device 101 hosts the application instance 102 and a mobile device 106 hosts the application instance 107. Examples of the mobile devices 101, 106 include smart phones, personal digital assistants, tablet computers, etc. The feedback agent controller 112 runs on a server 111. The feedback agent controller 112 communicates with the feedback agents 103, 108 across a network 110. The feedback agent controller 112 maintains a reference screen library 113 and an application experience data store 114. A playback client 115 hosts the playback module 116. The playback client 115 communicates with the feedback agent controller 112 across network 110.

FIG. 1 lists a series of letters A-F. These letters represent operational stages, each of which may include multiple operations. Although these stages are ordered for this example, the stages illustrate one example to aid in understanding this disclosure and should not be used to limit the claims. Subject matter falling within the scope of the claims can vary with respect to the order and some of the operations.

At stage A, the feedback agent 103 captures and transmits screen-based application experience data 104 ("application experience data 104") that includes a sequence of captured screens. An application screen or screen, for this disclosure, refers to a composition of an application's graphical content displayed by a device for the application (e.g., content of an application's graphical user interface ("GUI")). As a user interacts with the application instance 102, the feedback agent 103 captures data that represents the user experience, which includes indications of the interactions. This data at least includes images of the sequence of application screens of the application instance 102 presented on the mobile device 101 during a session of the application instance 102, identifiers of the screens (e.g., screen name), and indications of user interactions. Examples of the user interaction indications include events or event identifiers (e.g., device rotation to cause change in orientation of the screen), location of user interactions with respect to a screen (e.g., where a touch was detected or direction of an action), etc. The feedback agent 103 provides this information to the feedback agent controller 112 via the network 110. For example, the feedback agent 103 captures a bank account home screen and the subsequent screens presented in a session of the application instance 102. For each captured screen the feedback agent 103 also captures the user interactions with the captured screen (e.g., a zoom-in action on the home screen, followed by selection of a first account of multiple presented accounts). The feedback agent 103 then dispatches the captured application experience data 104 for a session to the feedback agent controller 112.

At stages B1 and B2, the feedback agent controller 112 uses screen images from the application experience data 104 to maintain the reference screen library 113 and update the application experience data store 114. The feedback agent controller 112 adds to the reference screen library 113 the captured screens communicated from the feedback agent 103. The screens may be new additions or may replace existing screen images. The feedback agent 103 also stores a screen-based experience sequence for the session represented by the application experience data 104 in the application experience data store 114 at stage B2. The depicted separation between the application experience data store 114 and the reference screen library 113 is logical. The data can reside in a same database, different databases, different storage devices, etc.

At stage C, the feedback agent controller 112 communicates a message 121 for the feedback agents 103, 108 to stop capturing screens. The feedback agent controller 112 determines that a criterion is satisfied for collecting screen captures and instructs the agents to stop capturing screens. For this illustration, the feedback agent controller 112 has already partially built the reference screen library 113 with captured screens from deployed feedback agents 103, 108, and the collection criterion is satisfied after receipt of the application experience data 104. For example, after storing the captured screens from the application experience data 104 in the reference screen library 113, the feedback agent controller 112 determines that the reference screen library 113 includes a defined set of baseline screen images for user application experience analysis.

At stages D1 and D2, the feedback agents 103, 108 start communicating lightweight application experience data 105, 109 to the feedback agent controller 112 after receipt of the stop screen capture message 121. Although the feedback agents 103, 108 may still locally capture screens, the feedback agents 103, 108 no longer communicate the screens (i.e., images) to the feedback agent controller 112 after receipt of the stop command. Instead, lightweight application experience data is communicated back to the feedback agent controller 112. Lightweight application experience data include indications of screen-based application experiences without screen capture images. Lightweight application experience data represents screens with screen identifiers. At stage D1, feedback agent 108 captures and transmits lightweight application experience data 109 to the feedback agent controller 112 via the network 110. At stage D2, feedback agent 103 captures and transmits lightweight application experience data 105 to feedback agent controller 112 via the network 110.

At stage E, the feedback agent controller 112 updates the application experience data store 114 based on the lightweight application experience data 105, 109. As previously mentioned, the lightweight application experience data 105 includes screen identifiers instead of screens and indications of interactions with the identified screens for a session at the mobile device 101. Similarly, the lightweight application experience data 109 includes screen identifiers and indications of interactions with the identified screens for a session at the mobile device 106 instead of screens.

The administrator may, for various reasons (e.g. resolve a customer service issue, perform an application usability analysis), decide to playback one or more user sessions. Stage F depicts a playback of one user session performed by the playback module 116 executing on the playback client 115. At stage F, the playback module 116 uses an application session identifier to retrieve an application experience data 118 for a particular user session from the application experience data store 114. Using the retrieved application experience data 118, the playback module 116 reconstructs the user session to create the reconstructed screen-based application experience sequence 117. When the playback module 116 encounters a screen identifier without a corresponding image in the application experience data 118, the playback module 116 retrieves from the reference screen library 113 a reference screen identified by the screen identifier. The playback module 116 plays back the reconstructed user session as a reconstructed screen-based application experience sequence 117.

Although FIG. 1 referred to user interactions, application experience data can include data about more than user interactions to represent application experience. Application experience data can include indications of events other than those events that are explicit user interactions (e.g., control selections and touches). For instance, a screen may automatically play a video when a user navigates to the screen. User experience analysis may take into consideration this auto-play of a video because the user has not turned off auto-playback of videos.

Figure 2:
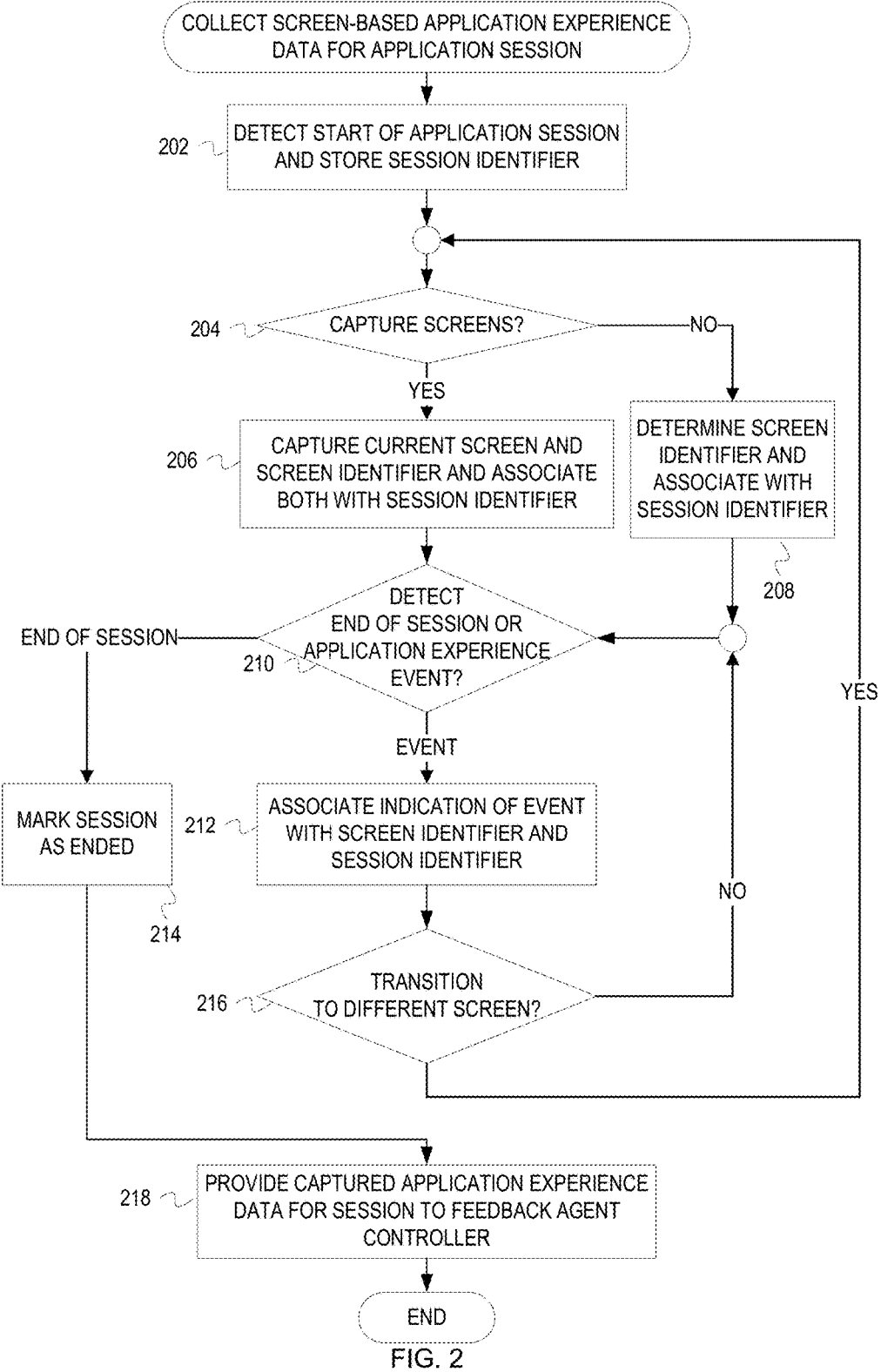
FIG. 2 depicts a flow diagram for example operations for collecting application experience data for an application session.
Figure 3:
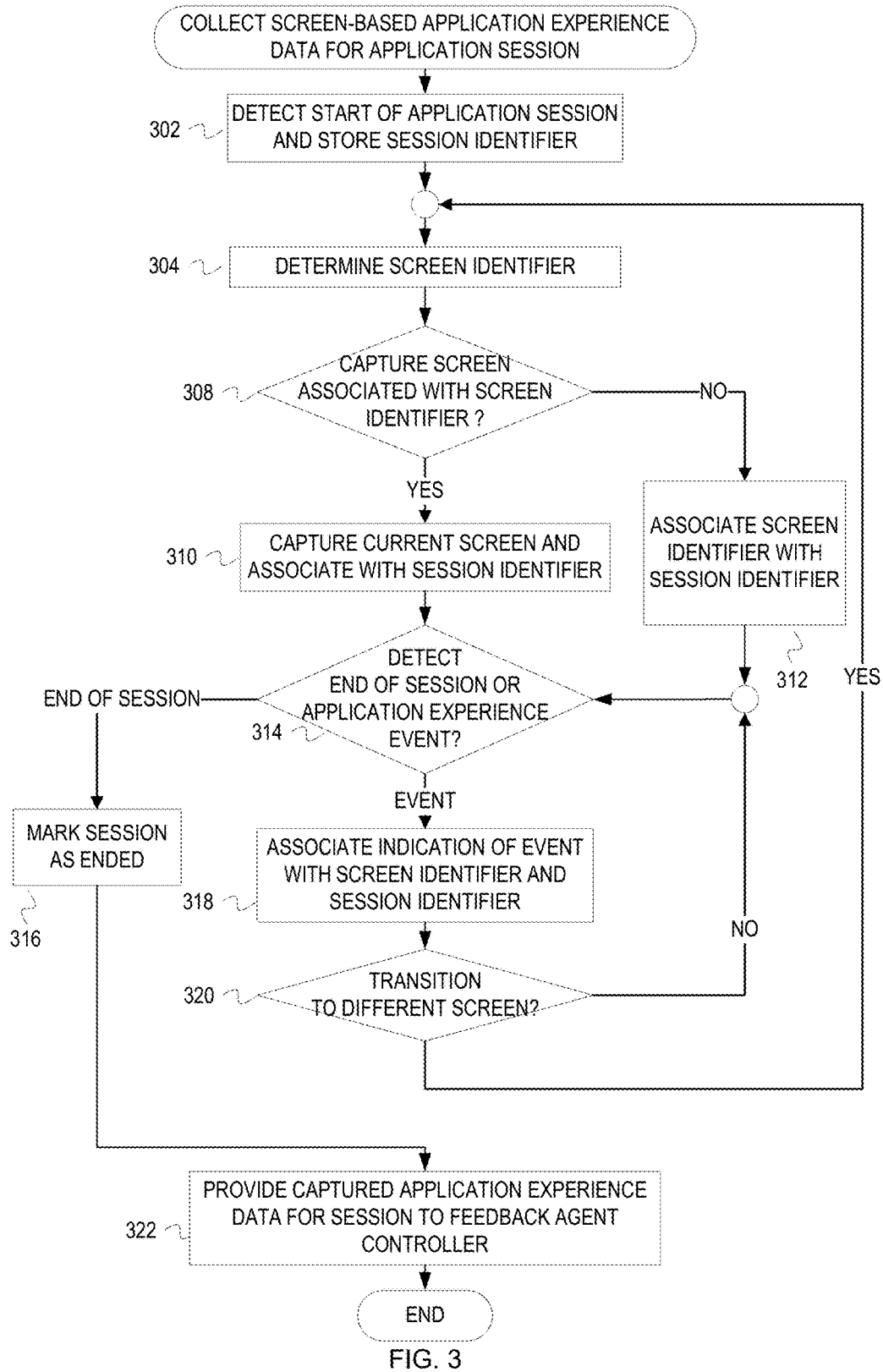
FIG. 3 depicts a flow diagram of example operations for screen identifier based collection of application experience data for an application session.
Figure 4:
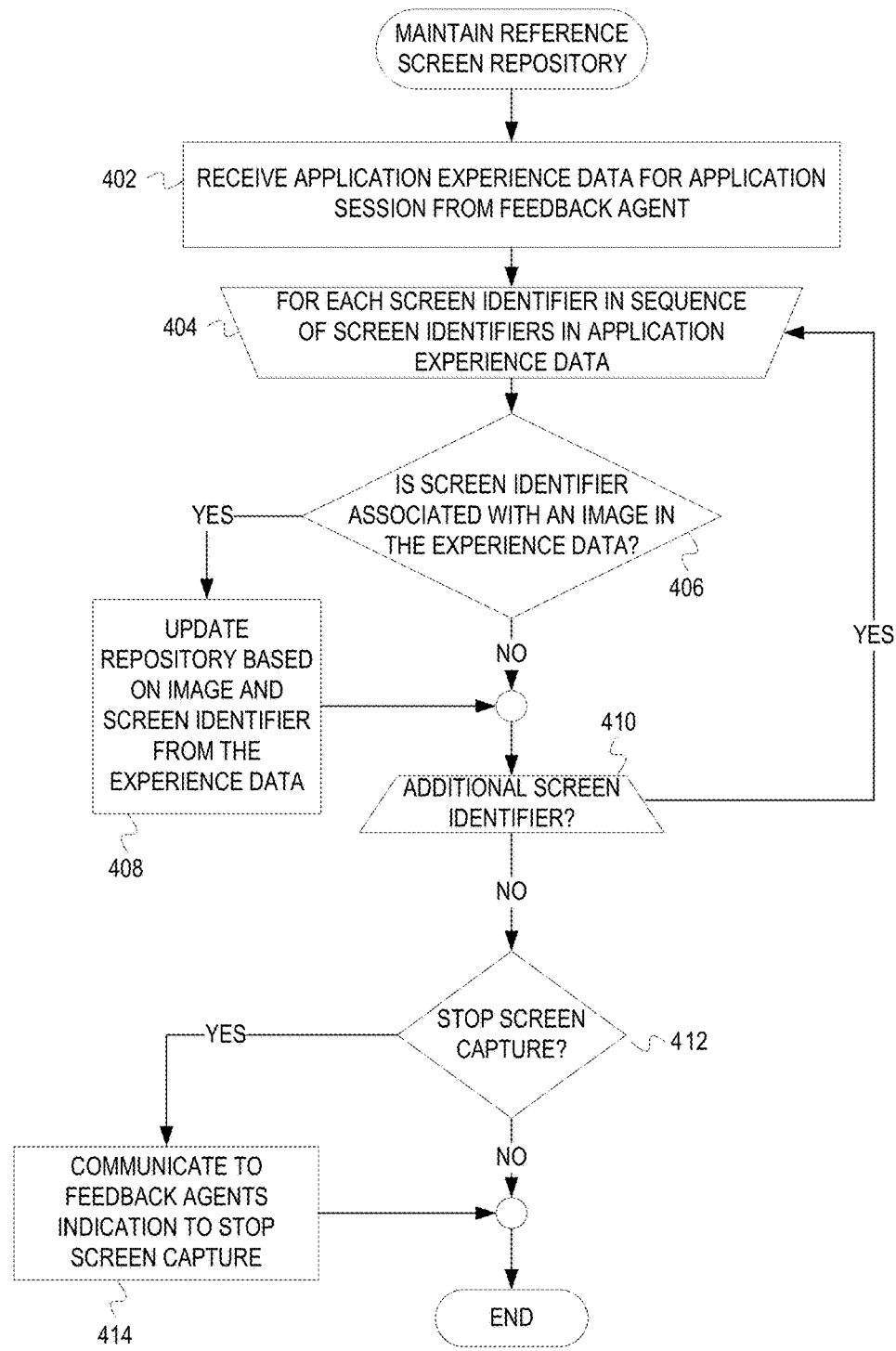
FIG. 4 depicts a flowchart for maintaining a reference screen repository to facilitate use of lightweight application experience data.
Figure 5:
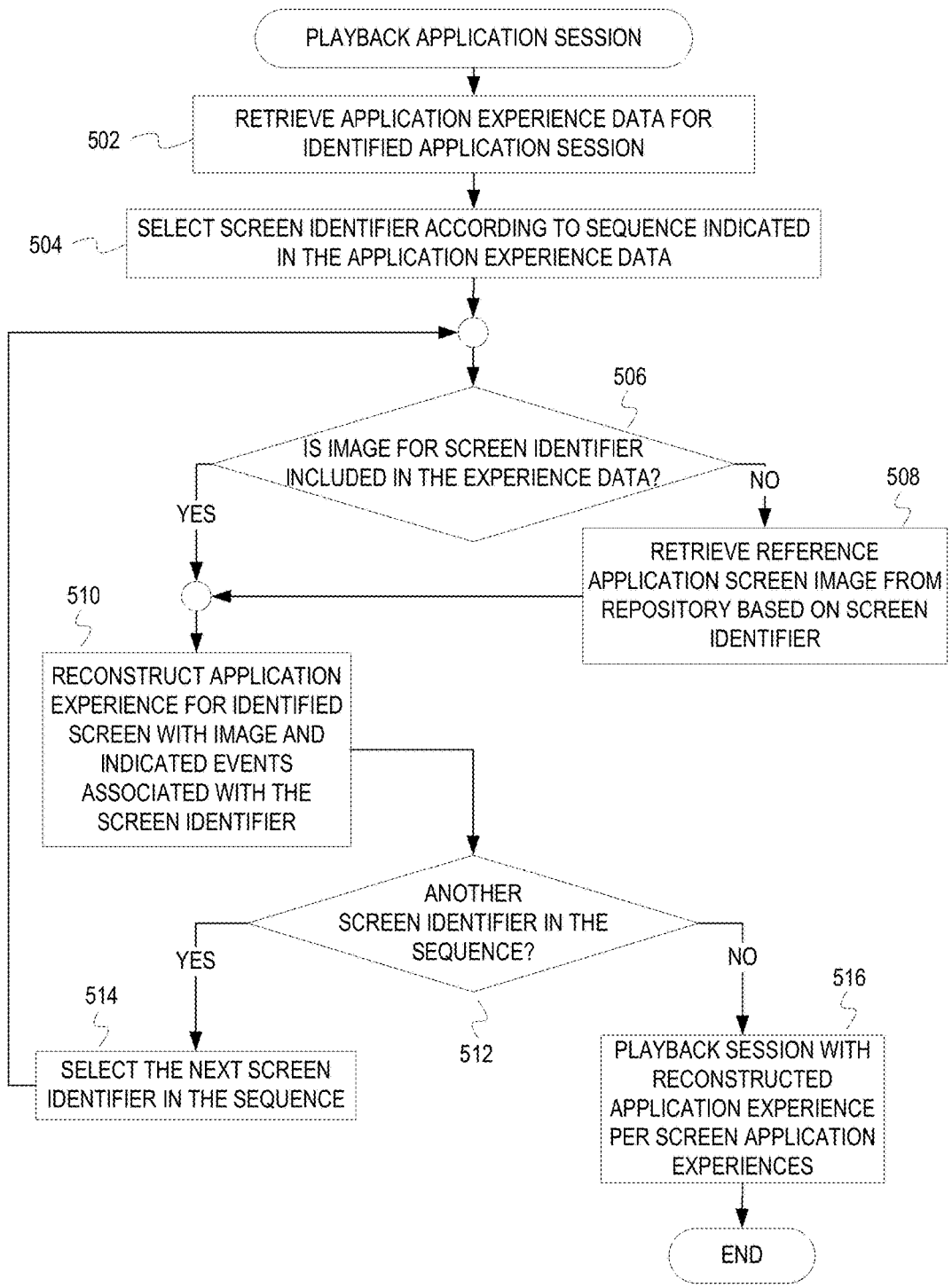
FIG. 5 depicts a flowchart of example operations for playback of an application session that may be represented with lightweight application experience data.

The following figures depict flowcharts of example operations for various aspects of efficient collection and playback of screen-based application experience with screens of an application. FIGS. 2-3 depict flowcharts of example operations for different techniques of collecting application experience data. FIG. 4 depicts a flowchart of example operations for maintaining a reference screen library. FIG. 5 depicts a flowchart of example operations for reconstructing a screen-based application experience sequence with reference screens for session playback.

FIG. 2 depicts a flow diagram for example operations for collecting application experience data for an application session. FIG. 2 refers to a feedback agent performing the operations for naming consistency with FIG. 1 even though identification of program code can vary by developer, language, platform, etc.

When a feedback agent detects the start of the application session, the feedback agent stores the session identifier (202). An application session is a group or series of activities such as screen views, interactions, and/or events that take place within a time frame. For example, an application session may consist of a single screen view or contain multiple screen views and any number of events for each of the screen views from the time the application session starts until the application session ends. An application may launch the feedback agent when the application launches or when the application starts a session (e.g., an application session may not start until after login). The application may launch the feedback agent when the application launches and notify the feedback agent when an application session begins. If the feedback agent is external to the application (e.g., a plug-in), a feedback agent can register with an operating system for notifications of events to detect start of an application session.

Although the time frame for a session may be directly based on time (e.g., a timer), the time frame is not necessarily based directly on time. The time frame for a session may be defined by the application's operational status and/or activity that is detected by the feedback agent. An application session may start when the application is launched. An application session on a smartphone may continue and not be considered as ending when paused and/or moved to the background, for example, when there is an incoming call. An application session may resume when moved from the background to the foreground. A feedback agent can detect these activities by intercepting notifications of events or registering with the operating system or corresponding application to receive notifications of these events. For example, the feedback agent can register to receive notification of when a user initiated activity wakes or moves an application into a foreground and resume monitoring the application session. An application may be active even if the application is not in the foreground (e.g. the application is sitting behind a dialog) but the user is interacting with an element or part of the application (e.g. the user is clicking on the dialog). The end of the application session may be detected from different events or activities such as the user closing the application, the mobile device shutting down the application due to reasons such as low memory or loss of power, etc.

Each application session is identified by a unique identifier normally distinct from the mobile device identifier. A session identifier may be a token that can be revoked in the event that the mobile device is stolen or the application session is compromised. A session identifier may also be a timestamp or a unique identifier from a monotonically increasing counter maintained by the application. The feedback agent may use the mobile device buffer to store the session identifier. For security purposes the session identifier may be transformed prior to storage, for example the session identifier may be stored as a hash value or encrypted.

After the feedback agent detects start of an application session, the feedback agent determines whether it should capture screens (204). Different mechanisms can be used for the feedback agent to make this determination. The feedback agent can check a flag or value that indicates whether screens are to be captured. This flag or value can be initialized with either a capture or do not capture value and be modified according to an instruction from the feedback agent controller. The feedback agent can also be programmed to change the flag/value depending upon a specified criterion. For instance, the feedback agent can change from capture to do not capture after capturing a specified number of different screens and/or after a defined time period. The feedback agent can also switch from do not capture to capture after not capturing screens for a specified number of sessions and/or a defined time period. The feedback agent can also switch from do not capture to capture after the application is updated. For example, the feedback agent may switch to capture after detecting that the application version has changed from 1.0 to 1.1 or 2.0.

If the feedback agent determines that it should capture the screen (204), then the feedback agent captures the currently displayed screen and a screen identifier and associate both the captured screen and the screen identifier with the application session identifier (206). As previously mentioned, capture of a screen is not necessarily capture of all graphical content presented on a physical screen of the host device. A "screen capture" at least captures a graphical composition being displayed for an application, such as graphical composition with or without the encapsulating window. The screen capture may also include additional background content not obscured by the application's screen, an additional control and/or window corresponding to the application (e.g., a child graphical content container), etc. "Capturing" of the graphical composition can involve capturing the graphical composition as a single image file (e.g., a Joint Photographic Experts Group ("JPEG") file, a Graphics Interchange Format ("GIF") file, a Portable Network Graphics ("PNG") file). The feedback agent associates both the captured screen and the screen identifier with the application session identifier (206). For instance, the feedback agent can maintain application session data indexed by the session identifier. The feedback agent can maintain each entry in the application session data to include a screen identifier and a corresponding captured screen, if any. The screen identifier may be generated by the application or it may be created using some function, for example concatenating the screen name and the application identifier.

If the feedback agent determines that it should not capture screens (204), the feedback agent determines the identifier of the currently displayed screen and associates the screen identifier with the application session identifier (208). Since the flag/value indicates do not capture, the feedback agent does not capture the displayed screen, but still determines the identifier of the displayed screen. To determine the screen identifier, the feedback agent can read metadata of the currently displayed screen or call a method/function that returns an identifier of the currently displayed screen. The feedback agent then stores the screen identifier in the entry of the current application session data.

After determining the screen identifier and possibly the identified screen, the feedback agent determines if the application session is ended or if there is an event that relates to user experience with the application ("application experience event") (210). If the feedback agent detects the end of the current application session (210), the feedback agent marks the session as ended (214). The feedback agent can set a bit for the entry of the application session data to indicate that the session has ended or write a value (e.g., a timestamp) that implicitly indicates end of the application session. Additionally, the feedback agent may detect that the application has ended based on the application being exited or closed.

After the session has ended, the feedback agent provides the application experience data for the application session to the feedback agent controller (218). If the feedback agent cannot provide the application experience data to the feedback agent controller due to a problem (e.g. the network is down), the feedback agent may store the application experience data in the mobile device persistent storage/memory and then dispatch the application experience data to the feedback agent controller when possible. The feedback agent may transform the application experience data before it is dispatched to the feedback agent controller through the network. For example, the feedback agent may encrypt or hash identifiers, such as the session identifier and the screen identifier. As another example, the feedback agent may capture screens in a file format such as bitmap or vector image format, and then transform the captured screens into a more space efficient format (e.g., JPEG).

If the feedback agent detects an application experience event (210), the feedback agent associates the indication of the application experience event with the currently displayed screen and current session identifier (212). For instance, the feedback agent can store an event identifier and/or event description (e.g., selection of a graphical user interface control or detecting touch on a screen) as metadata or related data for the currently captured screen. This information can be encoded into the captured screen or associated with the screen identifier. The feedback agent can also associate additional data, such as coordinates of a screen touch and performance data captured along with the screen or screen identifier. The term "experience related data" is hereinafter used to encompass indication of an application experience event with or without additional data. If the feedback agent determines that the application experience event caused a transition to a different screen (216), the feedback agent then determines whether or not to capture the different screen being displayed (204). If the application experience event does not cause a transition to a different screen (216), the feedback agent then determines if it is the end of the session or if there is another application experience event with the current screen (210).

The feedback agent will continue capturing screens and/or determining screen identifiers along with experience related data until the feedback agent detects the end of the application session (210). In some implementations, the feedback agent may not wait for the application session to end before it dispatches the collected data of a partial session to the feedback agent controller. In other implementations, the feedback agent may perform an opportunistic dispatch of the application experience data for a partial application session to the feedback agent controller. For example, even if the application session is not over but the application session pauses, the feedback agent may send the data for the partial application session to the feedback agent controller. Different techniques can be used to reconstruct an application session from partial session application experience data. For example, the feedback agent may associate a timestamp (e.g. Epoch time) with each dispatched partial session application experience data. The application session can be reconstructed from the partial sessions with ordering by timestamps. As another example, each partially captured session can be associated with an ordered symbol as markers (e.g., an incrementing counter, alphabetical letters, etc.).

FIG. 3 depicts a flow diagram of example operations for screen identifier based collection of application experience data for an application session. These example operations determine whether to collect particular screens of an application based on screen identifier in contrast to FIG. 2 which can be considered a mode for capturing screens.

Similar to FIG. 2, when a feedback agent detects the start of an application session, the feedback agent stores the session identifier (302). The feedback agent then determines the screen identifier of the currently displayed screen (304). The feedback agent then determines whether the currently displayed screen should be captured (308). The feedback agent may check a list of screen identifiers that is marked for capture. A list is basically a collection of values which may be implemented as an array or linked list, for example. Regardless of how the screen identifiers are arranged, the feedback agent may receive the screen identifiers from the feedback agent controller which identify screens not to be captured or screens to be captured. Other ways of determining whether the currently displayed screen should be captured may be implemented, such as using a set or hash tables instead of a list. In another implementation, the feedback agent may call a method/function that returns a Boolean value on whether to capture the screen or not. In yet another implementation, the feedback agent may check a flag set for each screen identifier. The flag may indicate whether the screen should be captured or not.

If the feedback agent determines that it should capture the screen associated with the screen identifier (308), then the feedback agent captures the currently displayed screen associated with the screen identifier and associates the captured screen with the session identifier (310).

If the feedback agent determines that it should not capture the screen associated with the screen identifier (308), the feedback agent associates the screen identifier with the application session identifier (312) and does not capture the currently displayed screen. To associate, the feedback agent can update an application session data with the screen identifier.

After capturing the screen identifier and possibly the identified screen, the feedback agent will detect if the application session is ended or if there is another application experience event (314). If the feedback agent detects the end of the session, the feedback agent marks the session as ended (316). Similar to FIG. 2, the feedback agent may mark the session as ended using different implementations. The feedback agent then provides the application experience data for the current application session to the feedback agent controller (322).

If the feedback agent detects an application experience event (314), the feedback agent associates the indication of the application experience event with the screen identifier and application session identifier (318). For example, the feedback agent can update an entry for the screen in the application session data with the indication of the event.

If the feedback agent determines that the application experience event caused a transition to a different screen (320), the feedback agent then captures the screen identifier (304) of the different screen and determines the screen associated with the screen identifier (306). The feedback agent then determines whether or not to capture the different screen being displayed associated with the screen identifier (308), and associates the different screen identifier and possibly the image of the captured different screen with the application session identifier. The feedback agent then determines if it is the end of the session or if there is another experience related event with the current screen (314).

Similar to FIG. 2, the feedback agent will continue capturing screens associated with the screen identifier along with the experience related data until the session ends. Similar to FIG. 2, the feedback agent may not wait for the application session to end before it dispatches the collected data.

FIG. 4 depicts a flowchart for maintaining a reference screen repository to facilitate use of lightweight application experience data. FIG. 4 refers to a feedback agent controller performing the operations for naming consistency with FIG. 1 even though identification of program code can vary by developer, language, platform, etc.

The feedback agent controller receives application experience data for an application session from a feedback agent (402). The feedback agent controller is part of a system that includes agents deployed with an application on mobile device (e.g. feedback agents). The feedback agent controller communicates with the feedback agents by way of communication protocols (e.g. Transmission Control Protocol/Internet Protocol ("TCP/IP"), User Datagram Protocol ("UDP")). The feedback agent controller may parse a message(s) carrying the application experience data. Since the feedback agent controller can receive messages with the application experience data from any number of deployed feedback agents, the feedback agent controller may have a scheduling system that prioritizes incoming messages (e.g. "First In, First Out" ("FIFO"), "Last In, First Out" ("LIFO")).

The feedback agent controller begins to traverse the screen identifiers indicated in the received application experience data (404). The feedback agent controller can traverse the screen identifiers according to the sequence indicated in the application experience data, but that is not necessary. The feedback agent controller updates a reference screen repository with the images in the application experience data (406, 408).

For each screen identifier, the feedback agent controller determines whether the screen identifier is associated with an image in the application experience data (406). For example, the feedback agent controller may determine whether the application experience data includes a pointer from the screen identifier to an image if one exists or be null if a corresponding image was not provided in the application experience data. The application experience data comprise a defined structure for each application screen. The defined structure can include a member or field for the screen identifier and a member or field for an image of a captured screen. The member/field can indicate a value or flag that represents empty or repeat the screen identifier if there is no corresponding image. If there is no corresponding image (406), then the feedback agent controller determines whether the application experience data includes another screen identifier (410). If so, then the feedback agent controller proceeds with processing the next screen identifier (406).

If the feedback agent controller determined that the application experience data included an image corresponding to the screen identifier (406), then the feedback agent controller updates the reference screen repository based, at least in part, on the image from the application experience data (408). The reference screen repository allows playback of sessions with lightweight application experience data. The repository is referred to as a "reference screen" repository because the application screen images therein are "referred" to by screen identifiers that lack corresponding images in application experience data from feedback agents. An application session can be played back with a reconstruction of the application experience for that session with reference screen images referred to by screen identifiers, but those reference screen image may not be identical to the corresponding application screens presented during the session. The reference screen repository may be a database of screen identifiers mapped to screen images. The update may be addition of an image from application experience data into the reference screen repository due to absence of the screen identifier from the repository. However, the update can involve other determinations. Initially, the repository may be empty. A developer can populate the repository with all application screens of an application. These application screen images are somewhat artificial since they are produced in a laboratory type of environment and do not reflect differences that may arise from deployment on various mobile devices. For instance, application screens may include dynamically generated content or be dynamically arranged. In addition, the time to populate the repository with every possible application screen may not be acceptable for a schedule for application release. As a compromise, the repository may be initially populated by a developer with a small number of the application screens, such as static application screens. Whether pre-populated or populated only with images from deployed feedback agents, the feedback agent controller may update the repository with an image even when an image is already stored in the repository for a screen identifier. As one example, the feedback agent controller may replace a screen image that was created by a developer with a screen image from a deployed feedback agent to more accurately capture application experience. The repository can be updated with screen images if a reference screen image expires based on an expiration policy for screen images or based on changing versions of an application (e.g., version information of a screen image no longer matches a current application version).

After either updating the reference screen repository or determining that the screen identifier lacks a corresponding screen image in the application experience data, the feedback agent controller determines whether the application experience data includes another screen identifier (410). If there is another screen identifier, then the feedback agent controller selects the next screen identifier for processing (404).

If the feedback agent controller determines that there are no additional screen identifiers in the application experience data (410), then the feedback agent controller determines if screen capture should be stopped (412). Any of a variety of criteria or combination of criteria can be used to indicate when screen capture should stop. As previously described, screen capture can stop at different granularities also (e.g., generalized stop capture or screen identifier specific screen capture). Example criteria for stopping screen capture include a threshold number of captured screens, a threshold number of different categories of captured screens, expiration of a time period for screen capture, etc.

If the feedback agent controller determines that screen capture should stop (410), whether a general stop or a stop for a specific set of application screens, the feedback agent controller communicates to deployed feedback agents an indication to stop screen capture (414). The feedback agent controller may send message with a command or request a stop capture generally, to stop capture of a specified set of application screens, or to only capture a specified set of application screens, for example. The message can be distributed as a broadcast message or piggyback other messages to the feedback agents. The feedback agent controller may also set a flag or value in the application that the feedback agent can detect.

FIG. 5 depicts a flowchart of example operations for playback of an application session that may be represented with lightweight application experience data. FIG. 5 refers to a playback agent performing the operations for naming consistency with FIG. 1 even though identification of program code can vary by developer, language, platform, etc. The program code for the playback agent may be executed on a single device or across multiple devices. For example, with reference to FIG. 1, a portion of the playback agent may be executed on the feedback agent controller 112 to reconstruct the application experience, and another portion of the playback agent may execute on the playback client 115 to playback the reconstructed application experience.

When the playback agent receives a request to playback an application session, the playback agent retrieves application experience data for the application session (502). An administrator, for example, can browse through a repository of application experience data for different application sessions and select one of the application sessions. Regardless of how an application session is selected, the request at least uses a session identifier to retrieve application experience data to be used for session playback. In addition to a session identifier, other data, such as an application identifier and/or time range, can be used to retrieve application experience data for a session.

The playback agent selects a screen identifier from the retrieved application experience data (504). The playback agent selects the screen identifier according to a sequence indicated in the application experience data. The application experience data may indicate display sequence of the screens with explicit timestamps or integers. The application experience data can also indicate display sequence with arrangement of the screen identifiers in the application experience data.

With the screen identifier, the playback agent determines whether the application experience data includes a screen image associated with the screen identifier (506). The application experience data can index images by screen identifiers or otherwise associate screen identifiers to screen images. If the application experience data does not include an associated image, then the playback agent retrieves a reference application screen based on the screen identifier (508). The playback agent accesses a reference screen repository with the screen identifier to retrieve a reference screen identified by the screen identifier. In some cases, playback can fail if the repository does not include a reference screen image for the screen identifier.

If the screen identifier is associated with an image in the application experience data or after a reference screen is retrieved, the playback agent reconstructs the application experience for the identified screen (510). The playback agent reconstructs the application experience for the identified screen with the image and indicated events associated with the screen identifier in the application experience data. The indicated events will also be associated with timestamps for proper ordering of the indicated events during session playback. After reconstructing the experience for the identified screen, the playback agent determines whether the application experience data indicates another screen identifier in the display sequence (512). If so, the playback agent selects the next screen identifier in the display sequence (514). Eventually, the playback agent reconstructs the application experience for the application session with the per screen application experiences that have been reconstructed. With the per screen application experiences reconstructed, the playback agent can playback the session for analysis of the application experience (516).

Variations

The above examples refer to non-specific capturing of screens until switched into a mode of not capturing screens, and refer to stopping capture of specific screens by screen identifier, perhaps a black list of screen identifiers. Embodiments can use other techniques to guide screen capture. For example, the feedback agent controller can communicate a whitelist of screen identifiers to feedback agents. The whitelist specifies screens that should be captured to the exclusion of other screens not identified. As another example, screen capture can be less granular than screen identifier, such as screen type or category. For example, for security purposes, an application experience feedback system can determine that all logon screens will not be captured to protect users. Application screen metadata can indicate both a screen identifier and screen category/type used to restrict screen capture. In addition, embodiments can categorize or classify screens with an abstracted classification. For instance, a screen can be categorized as a level 2 screen instead of (or in addition to) categorization as a logon screen.

As discussed above, a reference screen repository may not have a reference screen image for a screen identifier when trying to playback an application session. The reference screen may have expired, the image in the application experience data may be corrupted, etc. Embodiments can communicate to feedback agents a request for screen capture of the application screen identified by the screen identifier.

The examples often refer to various "agents" and a "feedback agent controller." The agents and the agent controller are constructs used to refer to implementation of functionality for a feedback system that collects lightweight application experience data. These constructs are utilized since numerous implementations are possible use of the constructs allow for efficient explanation of content of the disclosure. Although the examples refer to operations being performed by an agent or feedback agent controller, different entities can perform different operations. For instance, a different program can be responsible for maintaining the reference screen repository while the feedback agent controller interacts with feedback agents to control the behavior of the feedback agents.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation(s) represented at 414 in FIG. 4 can be performed after each repository update (408) when screen capture is stopped for particular screens. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
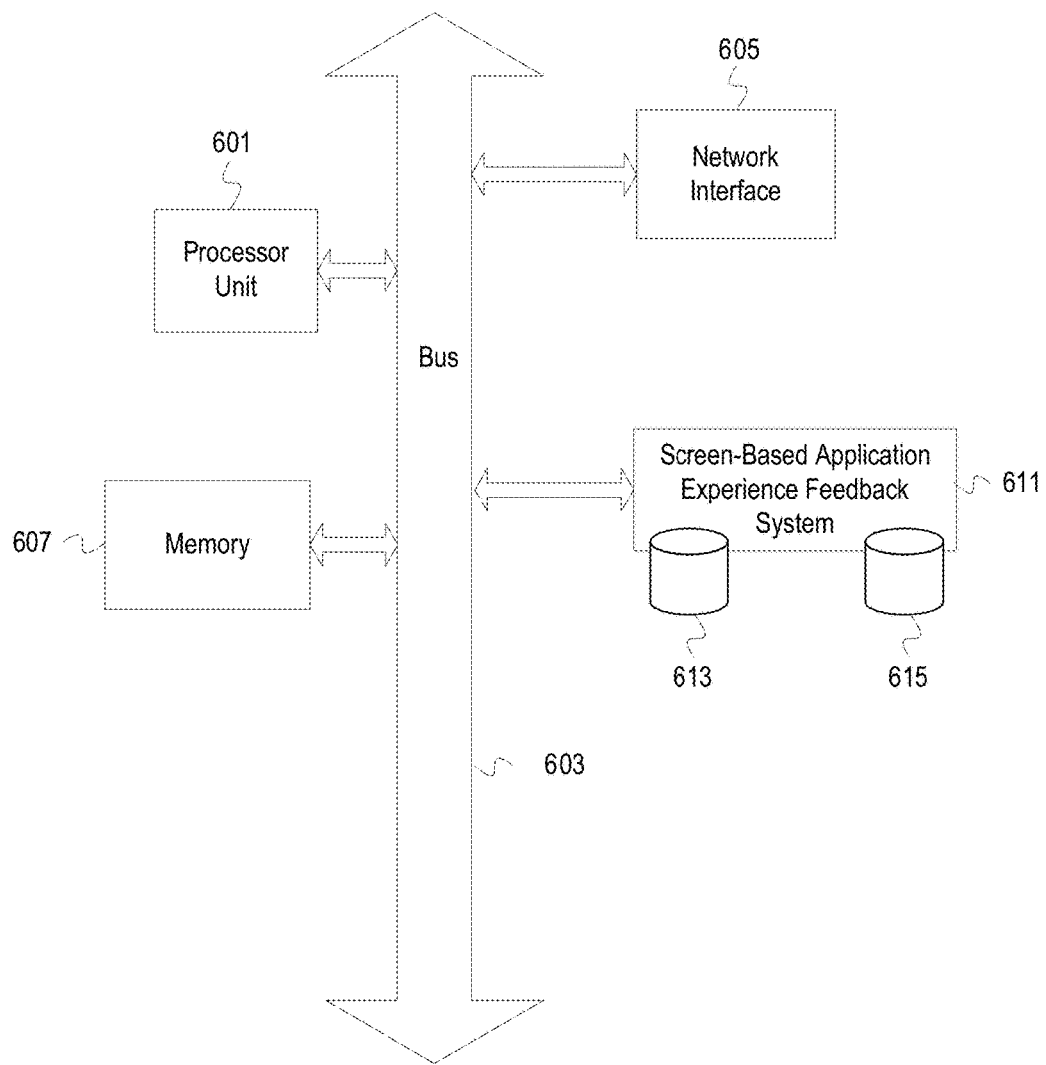
FIG. 6 depicts an example computer system with a screen-based application experience feedback system.

FIG. 6 depicts an example computer system with a screen-based application experience feedback system. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an interne small computer system interface, SONET interface, wireless interface, etc.). The system also includes a screen-based application experience feedback system 611. The screen-based application experience feedback system 611 includes a reference screen repository 613 and a per session screen-based application experience data repository 615. The screen-based application experience feedback system 611 controls agents deployed for an application on mobile devices to collect application experience data and lightweight application experience data. The screen-based application experience feedback system 611 also allows playback of application sessions with lightweight application experience data and reference screen images from the repository 613, Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for efficient screen-based application experience data collection with reduced exposure of PII as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   detecting a stop screen capture indication generated based on a determination that a set of baseline images of application screens for an application have been collected;
   after detection of the stop screen capture indication,
      capturing screen identifiers of a first sequence of application screens presented on a mobile device display during a first session of the application; and
      for each of the first sequence of application screens, capturing each detected event corresponding to the application screen; and
   dispatching first application screen-based information about the first session to a server, wherein the application screen-based information comprises the captured screen identifiers without an image of at least a first application screen of the first sequence of application screens and comprises indications of the detected events corresponding to the first sequence of application screens.

2. The method of claim 1 further comprising:
prior to detection of the stop screen capture indication,
    capturing each of a second sequence of application screens displayed on the mobile device, wherein the first sequence and the second sequence have at least some application screens in common; and
    for each of the second sequence of application screens, capturing each detected event corresponding to the application screen; and
dispatching second application screen-based information, wherein the second application screen-based information at least comprises images of the second sequence of application screens, identifiers of the second sequence of application screens, and indications of the detected events corresponding to the second sequence of application screens.

3. The method of claim 1 further comprising:
capturing a second application screen of the first sequence of application screens after determining that the stop screen capture indication does not identify the second application screen,
wherein the stop screen capture indication comprises a set of one or more screen identifiers that does not include a screen identifier that identifies the second application screen,
wherein the application screen-based information about the first session includes an image of the second application screen.

4. The method of claim 1, wherein capturing the screen identifiers comprises updating the application screen-based information about the first session with a screen identifier of an application screen of the first sequence when the application screen is displayed, wherein the application screen-based information about the first session indicates order of the first sequence.

5. The method of claim 1, wherein a first detected event represents a user interaction with a first application screen of the first sequence that corresponds to the first detected event.

6. The method of claim 1 further comprising detecting ending of the first session, wherein dispatching the application screen-based information about the first session is in response to detecting the ending of the first session.

7. The method of claim 1, wherein detecting the stop screen capture indication comprises detecting receipt of a message from the server with a command to stop capturing application screens.

8. The method of claim 1 further comprising:
maintaining a first collection of application screen-based information for a plurality of sessions of the application based, at least in part, on application screen-based information from a plurality of mobile devices that includes the mobile device; and
maintaining a second collection of application screens captured and provided by the plurality of mobile devices.

9. The method of claim 8 further comprising:
retrieving from the first collection the application screen-based information for the first session in response to request to playback the first session;
constructing the playback of the first session with the application screen-based information, wherein constructing comprises,
    for each screen identifier without an image of the corresponding application screen,
        using the screen identifier to request the image of the corresponding application screen from the second collection; and
        insert the image of the corresponding application screen into the playback according to the sequence of the application screens for the first session.

10. One or more non-transitory computer-readable media comprising program instructions for efficient application experience collection, the program instructions comprising:
agent program instructions to collect and dispatch application experience data for each session of an application on a mobile device, wherein the agent program instructions to collect the application experience data comprise agent program instructions to capture screen identifiers of application screens displayed during an application session and capture images of the application screens dependent upon a stop screen capture indication;
agent controller program instructions to,
    control when agents deployed on mobile devices collect and dispatch application experience data;
    communicate the stop screen capture indication to deployed agents based on a determination that a set of baseline images of application screens for the application have been collected;
    maintain a first collection of per application session screen-based application experience data; and
    maintain a second collection of images of application screens from agents deployed on mobile devices.

11. The one or more non-transitory computer-readable media of claim 10 further comprising program instructions for playback of a session, the session playback instructions to:
for each screen identifier without an image of the corresponding application screen,
    using the screen identifier to request the image of the corresponding application screen from the second collection; and
    insert the image of the corresponding application screen into the playback according to a sequence of the application screens for the first session indicated in the application experience data of the session.

12. The one or more non-transitory computer-readable media of claim 10, wherein the agent controller program instructions to control when agents deployed on mobile devices collect and dispatch application experience data comprise program instructions to direct the agents to at least stop dispatch of application experience data with application screen images when the second collection exceeds at threshold number of images of application screens.

13. The one or more non-transitory computer-readable media of claim 10, wherein the agent controller program instructions to communicate a stop screen capture to deployed agents comprise program instructions to communicate to deployed agents a set of one or more screen identifiers with the stop screen capture indication.

14. The one or more non-transitory computer-readable media of claim 13, wherein the stop screen capture indication indicates that the deployed agents should either stop capturing any screen identified by the set of one or more screen identifiers or should only capture any screen identified by the set of one or more screen identifiers.

15. A mobile device comprising:
a processor unit;
a display; and
a machine-readable medium comprising program instructions executable by the processor unit to cause the mobile device to, detect a stop screen capture indication generated based on a determination that a set of baseline images of application screens for an application have been collected;

after detection of the stop screen capture indication, capture screen identifiers of a first sequence of application screens displayed on the display of the mobile device during a first session of the application; and for each of the first sequence of application screens, capture each detected event corresponding to the application screen; and dispatch first application screen-based information about the session to a server, wherein the application screen-based information comprises the captured screen identifiers without an image of at least a first application screen of the first sequence of application screens and comprises indications of the detected events corresponding to the first sequence of application screens.

16. The mobile device of claim 15 further comprising program instructions executable by the processor unit to cause the mobile device to:

prior to detection of the stop screen capture indication, capture each of a second sequence of application screens displayed on the display of the application, wherein the first sequence and the second sequence have at least some application screens in common; and for each of the second sequence of the application screens, capture each detected event corresponding to the application screen; and dispatch second application screen-based information, wherein the second application screen-based information at least comprises images of the second sequence of application screens, identifiers of the second sequence of application screens, and indications of the detected events corresponding to the second sequence of application screens.

17. The mobile device of claim 15, further comprising program instructions executable by the processor unit to cause the mobile device to:

capture a second application screen of the first sequence of application screens after a determination that the stop screen capture indication does not identify the second application screen, wherein the stop screen capture indication comprises a set of one or more screen identifiers that does not include a screen identifier that identifies the second application screen, wherein the application screen-based information about the first session includes an image of the second application screen.

18. The mobile device of claim 15, wherein the program instructions executable by the processor unit to cause the mobile device to capture the screen identifiers comprises program instructions executable by the processor unit to cause the mobile device to:

update the application screen-based information about the first session with a screen identifier of an application screen of the first sequence when the application screen is displayed, wherein the application screen-based information about the first session indicates order of the first sequence.

19. The mobile device of claim 15, wherein a first detected event represents a user interaction with a first application screen of the first sequence that corresponds to the first detected event.

20. The mobile device of claim 15, further comprising program instructions executable by the processor unit to cause the mobile device to:

detect ending of the first session;

wherein the program instructions executable by the processor unit to cause the mobile device to dispatch the application screen-based information about the first session are executed in response to detection of the ending of the first session.

* * * * *